United States Patent
Smith-Uchida et al.

(10) Patent No.: US 11,341,000 B2
(45) Date of Patent: May 24, 2022

(54) CAPTURING AND RESTORING PERSISTENT STATE OF COMPLEX APPLICATIONS

(71) Applicant: VMware, Inc., Palo Alto, CA (US)

(72) Inventors: Dave Smith-Uchida, Palo Alto, CA (US); Somenath Bandyopadhyay, Santa Clara, CA (US); Jaswanth Gummadi, Dublin, CA (US); Lintong Jiang, San Jose, CA (US); Deepak Kinni, Palo Alto, CA (US); Revathy Shunmugam, Sunnyvale, CA (US); Xinyan Wu, Mountain View, CA (US); Nolan Brubaker, Goshen, IN (US); Derek Uluski, Weymouth, MA (US); Xiao Liu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 485 days.

(21) Appl. No.: 16/571,801

(22) Filed: Sep. 16, 2019

(65) Prior Publication Data
US 2020/0319978 A1    Oct. 8, 2020

Related U.S. Application Data

(60) Provisional application No. 62/829,025, filed on Apr. 3, 2019.

(51) Int. Cl.
*G06F 11/14*    (2006.01)
*G06F 9/455*    (2018.01)

(52) U.S. Cl.
CPC ...... *G06F 11/1469* (2013.01); *G06F 9/45558* (2013.01); *G06F 2009/45579* (2013.01);
(Continued)

(58) Field of Classification Search
CPC ....... G06F 11/1469; G06F 2009/45579; G06F 2009/45587; G06F 2009/45591;
(Continued)

(56) References Cited

U.S. PATENT DOCUMENTS 8,285,779 B2 * 10/2012 Acharya .............. H04L 67/24
                                                      709/238
9,851,952 B2 * 12/2017 Rodrigues ............. H04L 67/00
(Continued)

OTHER PUBLICATIONS

Unknown, "Production-Grade Container Orchestration", The Kubernetes Authors, copyright 2019, captured Sep. 14, 2019, http://kubernetes.io, 8 pages.

(Continued)

*Primary Examiner* — Merilyn P Nguyen

(57) ABSTRACT

The disclosure herein describes generating a protected entity of a VCI. A state document is generated based on the metadata state of the VCI and an entity data stream is set to a URI associated with the data of the VCI. Components and associated URIs of the VCI are identified. A combined data stream is set to a URI configured to provide access to the state document, the entity data stream, and the URIs of the components of the VCI. A snapshot API for providing a snapshot of the state of the protected entity, a serialization API for providing a serialized version of the protected entity, and a de-serialization API for converting a serialized version of the protected entity into a de-serialized version of the protected entity are defined. The protected entity is configured to enable the data and metadata of the VCI to be efficiently backed up.

20 Claims, 8 Drawing Sheets

(52) U.S. Cl.
CPC ........... *G06F 2009/45587* (2013.01); *G06F 2009/45591* (2013.01); *G06F 2201/84* (2013.01)

(58) Field of Classification Search
CPC ........... G06F 2201/84; G06F 9/45558; G06F 11/1448; G06F 11/1484
See application file for complete search history.

(56) References Cited

U.S. PATENT DOCUMENTS

| | | | | |
|---|---|---|---|---|
| 10,567,199 | B2* | 2/2020 | Butler | H04L 67/38 |
| 10,877,635 | B2* | 12/2020 | Gunther | G06Q 30/0201 |
| 2010/0251363 | A1* | 9/2010 | Todorovic | G06F 21/56 |
| | | | | 718/1 |
| 2011/0126099 | A1* | 5/2011 | Anderson | H04L 63/0807 |
| | | | | 715/751 |
| 2020/0310849 | A1* | 10/2020 | Laurence | G06F 9/5077 |
| 2020/0310850 | A1* | 10/2020 | Liguori | G06F 11/3476 |

OTHER PUBLICATIONS

Unknown, "Istio: Connect, secure, control, and observe services", Istio Authors, copyright 2019, captured Sep. 14, 2019, http://istio.io, 3 pages.

Unknown, "Virtual Disk Development Kit (VDDK)", VMware, Inc., copyright 2019, captured Sep. 14, 2019, https://code.vmware.com/web/sdk/67/vddk, 4 pages.

Ben-Kiki et al., "YAML Ain't Markup Language (YAML™)", copyright 2009, captured Sep. 14, 2019, https://yaml.org/spec/1.2/spec.html, 81 pages.

Unknown, "S3 Java Api Implementation", GitHub, Inc., copyright 2019, https://github.com/mindmill/ladon-s3-server, 3 pages.

Unknown, "Amazon S3 REST API", copyright 2019, Amazon Web Services, Inc., captured Sep. 16, 2019, https://docs.aws.amazon.com/AmazonS3/latest/API/Welcome.html, 2 pages.

* cited by examiner

CAPTURING AND RESTORING PERSISTENT STATE OF COMPLEX APPLICATIONS

CROSS-REFERENCING TO RELATED APPLICATION

This application claims the benefit of U.S. Provisional Application No. 62/829,025, filed Apr. 3, 2019, entitled "Capturing and Restoring Persistent State of Complex Applications", the entirety of which is incorporated by reference.

BACKGROUND

In some virtualized systems and/or environments, data protection is primarily centered around protecting virtual machines (VMs). Customers are interested in specifically protecting their applications, rather than just the VMs, but until recently, these goals were sometimes the same (e.g., a single application running on a single VM). Modern applications are distributed applications, composed of multiple microservices, running in containers managed by an orchestrator such as KUBERNETES. Furthermore, cloud scale architectures are being deployed at a smaller scale in enterprise environments. The concept of rolling back a cloud scale application to a previous point in time, or replicating portions or components of architectures for testing, is impractical with some existing systems.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 9, the systems are illustrated as schematic drawings. The drawings may not be to scale.

DETAILED DESCRIPTION

Figure 1:
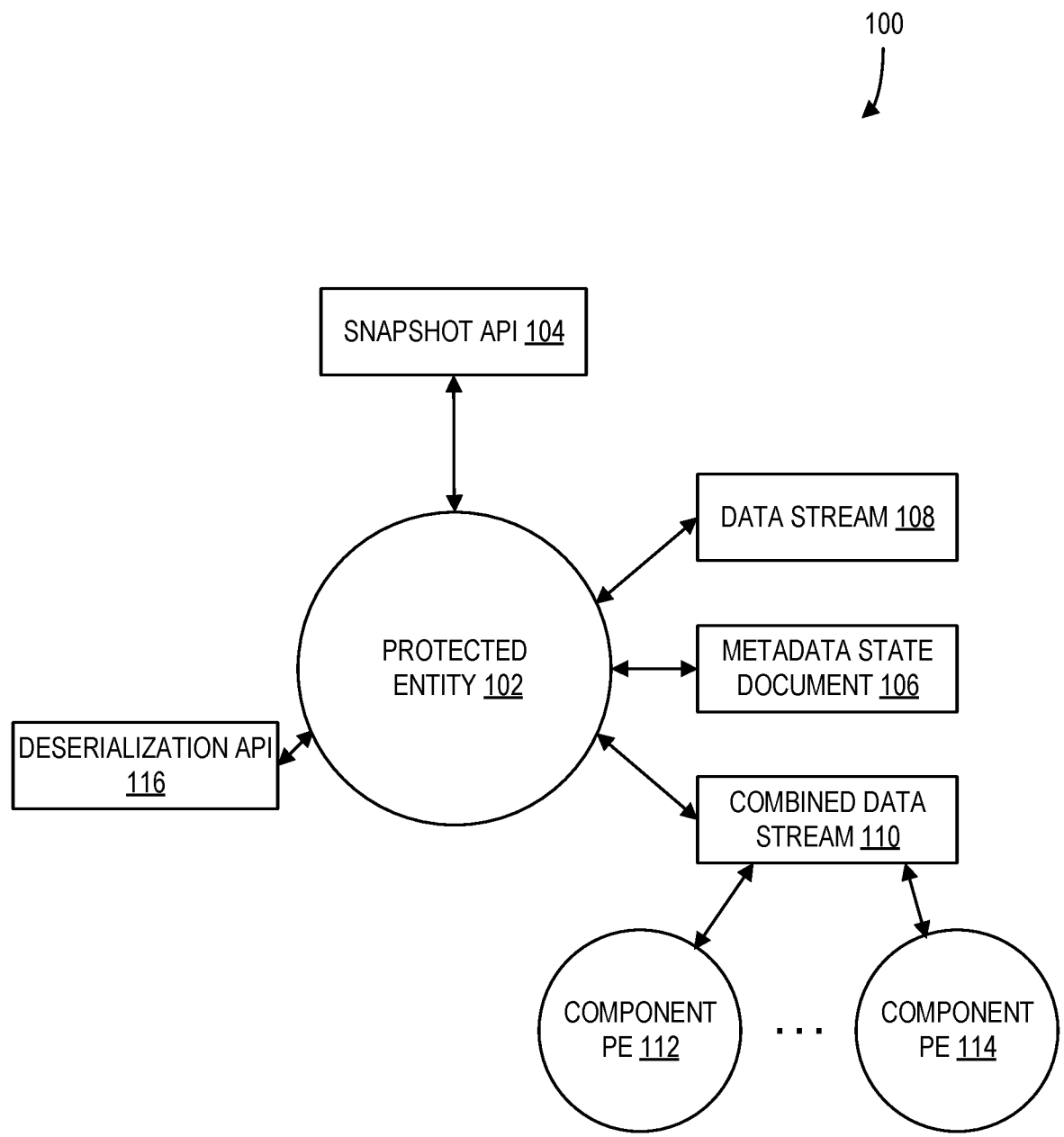
FIG. 1 is a block diagram illustrating a configuration of a protected element (PE) according to an embodiment.

Data protection includes, for example, backup, remote replication, disaster recovery, snapshotting and other mechanisms for ensuring the safety and availability of data. Replicating the state of an entity is part of data protection. Aspects of the disclosure provide systems and methods to protect the state of a complex entity, such as an application running in a virtualized environment and/or a container-based environment (e.g., KUBERNETES), by producing a "protected entity" (PE) data structure of the application. The PE of the application includes a graph and an application program interface (API) that allows for the application to be replicated as a whole via standard protocols or for individual components to be selected and replicated. Aspects of the disclosure provide data protection solutions that support distributed applications, including enabling the state of applications and other objects to be stored for use in recovering from malfunctions, etc.

Many virtualized environments run on a two-layer model: services provided by the platform and services provided by VMs and/or other virtual computing instances (VCIs). Services provided by the platform are separate from services provided by VCIs in the system. The platform provides services such as computation, networking, and storage to VCIs that make use of the services. In many cases, relationships and dependencies between VCIs are not tracked by the platform (e.g., VSPHERE). Container-based environments (e.g., KUBERNETES) have a similar model, with the platform providing computation, networking, and storage to applications but the interdependencies between the applications are not tracked.

The disclosure herein describes systems and methods configured to capture and/or track the "service mesh" of an environment, e.g., relationships and/or interdependencies between VMs, applications, containers, workloads, virtual disks, file shares, relational database management systems (RDBMS), object stores, key-value stores, and/or other VCIs in the environment. The disclosure operates in an unconventional way by providing for generation and use of a representation of a complex application (e.g., a PE) as a graph of nodes in a document or other data structure. The disclosure provides mechanisms for snapshotting, serializing, and deserializing the graph (e.g., CASSANDRA-based snapshot functionality). It exposes the structure of the graph so that sophisticated data protection orchestrators can backup/restore nodes in the graph in parallel for better performance. The disclosure further allows nodes to override or overload the default snapshot, serialization, and deserialization mechanisms, enabling the orchestrators to choose to use custom or specifically configured protocols or functions rather than the default protocols and functions.

The disclosure allows for extensions, enabling application-specific or higher performance data protection mechanisms. It also allows for new data types as storage services beyond block and file, such as object stores and key-value (KV) stores, become managed through KUBERNETES or similar environments.

The disclosure enables performance scaling for complex PEs through parallelism and the use of multiple data streams simultaneously to account for increasing performance challenges due to growing data sizes. The disclosure further encourages adoption by enabling existing vendors of backup solutions to leverage their expertise and existing code as much as possible. Additionally, the disclosure is configured to enable quick iteration and improvement without breaking backwards compatibility and for flexibility that enables it to be used and applied to new technologies.

Data protection, including snapshotting, backup, and remote replication, of complex applications is a requirement for adoption in the enterprise space. The disclosure (e.g., colloquially referred to as the system and/or framework) simplifies the discovery and serialization of a complex application, relying on standard protocols and file formats for easy adoption. The disclosure allows for parallelism in serialization and for new protocols to be introduced to improve performance. The framework is extensible and can handle new object types without any changes on the part of the backup orchestrator consuming the state document and PE data. Further, the formats and concepts described herein are not KUBERNETES-specific and can be used for non-KUBERNETES applications. The approach outlined herein is implementable as an external service to VSPHERE or other similar systems, such as an open source project, enabling it to be brought to market independently.

FIG. 1 is a block diagram 100 illustrating a configuration of a "protected entity" (PE) or "protected entity data structure" 102 according to an embodiment. An example PE 102 includes snapshot API 104 that enables the creation, deletion, and/or listing of current state data of the protected entity, enabling restoration of the protected entity to its state at a particular point in time; a metadata state document 106 that includes the metadata of the PE 102 and any component PEs (e.g., component PEs 112-114); a PE data stream 108 that enables access to data specifically for the PE 102, excluding the metadata and the component data; and a combined PE data stream 110 that enables access to the data and metadata of the PE 102 and the combined PE data streams from component PEs (e.g., component PEs 112-114). In some examples, the PE information is retrievable via a Simple Storage Service (S3) API or other similar interface. The metadata state document 106 may be returned in markup format (e.g., Yet Another Markup Language (YAML)) format and the data streams 108 and 110 may each have an S3 uniform resource identifier (URI) or similar identifier, such as a universal resource locator (URL). It should be understood that, while S3 is used as a protocol and YAML as a format in the description herein, other protocols may be used in alternative embodiments without departing from the description.

The disclosure describes systems and methods for bringing the state of an application or other VCI together into a document or other data structure such as PE 102 that describes all of the state information including configuration and data. PE 102 is configured to describe a snapshot or a running system. It is the canonical view of the application's state and what needs to be protected. Within the PE 102, the application is described as a directed, acyclic graph including its own data and other component PEs (e.g., PEs 112-114). Each PE provides its own state document and data streams for retrieving the data of the node. PEs can consume other PEs (e.g. PE 102 "consumes" component PEs 112-114), referred to as components or component PEs. In some examples, state documents of component PEs 112-114 are integrated into the consumer PE 102's state document when accessed via interfaces of the PE 102.

In some examples, PE 102 has at least three interfaces (e.g., APIs). The snapshot API 104 enables the capture of the state of the PE 102 at a point in time for use in backup of the PE or other processes described herein. Reading the metadata, data or combined datastreams serializes the corresponding PE state. A deserialization API 116 enables the deserialization of a serialized version of the PE 102 so that the state of the PE 102 can be restored from persistent storage. Additionally, PEs can be created from a PE definition by using the deserialization APIs of the service. The interfaces and configuration of a PE 102 may be based on default interfaces and/or operations. Alternatively, for a given PE 102, one or more of the interfaces of the PE 102 may be overridden to perform the operations of the overridden interface(s) in a specifically defined manner for that PE 102. For instance, portions of the PE 102 may be protected from or otherwise not included in snapshots and/or serialized formats of the PE 102 based on those operations.

A first PE (e.g., PE 112) is a "component PE" of a second PE (e.g., PE 102) when the second PE depends on the first PE for a service or another type of relationship. Snapshots of a PE include the state of the PE at the point in time and the snapshots of all component PEs of the PE and, if available, snapshots of all component PEs of the component PEs, etc. A PE can have many components and it may follow a general tree structure, wherein each PE may branch to multiple component PEs, resulting in a structural representation of complex service mesh environments. The tree structure of a PE and its associated component PEs enables processing of the PE and component PEs in parallel and/or using other methods to take advantage of the structure. Further, operations performed on a PE, such as generating a snapshot, may include recursively or otherwise iteratively traversing the associated tree of component PEs to generate snapshots thereof for inclusion in the snapshot of the PE. It should be understood that other operations, such as serialization and deserialization, may be configured to traverse the tree structure to comprehensively cover the entire service mesh associated with the PE.

In some examples, a PE is an effective way to represent the structure and state of a "consumer", which is a complex entity that needs to run with storage and computation resources in a cluster or similar environment (e.g., an application or other VCI running on VSPHERE or KUBERNETES environments). By representing such a consumer application with a PE, efficient backup and other processes may be performed (e.g., issuing administrator commands, setting policies at the top level that are iterated down through the component levels) as described herein. Further, issues on lower levels may rise up through the tree to indicate other PEs or applications that are affected (e.g., disks reporting errors, nodes crashing, etc.).

In some examples, to discover the topology of an application and retrieve its state information, a number of different APIs are used, and their output combined. For example, in current backup process of a VSPHERE system, discovering and extracting state information requires finding VMs in the system inventory, snapshotting the VMs, extracting and serializing VM metadata, enumerating the virtual disks attached to the VM, then extracting and serializing the virtual disk information via VSTORAGE API for Data Protection (VADP) APIs and proprietary VMWARE protocols. Even basic backup for a KUBERNETES application involves extracting the KUBERNETES metadata, enumerating the KUBERNETES Persistent Volumes (PVs), then using VMWARE Cloud Native Storage (CNS) APIs to translate PV IDs to First Class Disks (FCDs) (e.g., disks that are compatible with the VMWARE system), snapshotting via the FCD APIs and then using VADP to serialize the data. The disclosure defines a canonical view of what an application is, what it includes, and how to serialize that data in the form of the described PEs.

Returning to the description of FIG. 1, an exemplary metadata state document 106 of an FCD entity is provided below:

```
{
  type:fcd,
  uuid:48ce537f-066b-4aa4-a589-ef4ae9905a9a,
```

-continued

```
name:"MyFCD",
... other FCD metadata ...
snapshotID:,
data: [
{type:vadp,    uri:"vadp://48ce537f-066b-4aa4-a589-
ef4ae9905a9a :c86adcd1-2025-42a3-883f-bb0903e00b09"},
{type:s3,   uri:"http://myhost/fcd/48ce537f-066b-4aa4-
a589-ef4ae9905a9a: 48ce537f-066b-4aa4-a589-ef4ae9905a9a
"}
]
}
```

In this state document, the type, UUID, and name of the described FCD are listed first. Then, other FCD metadata may be listed. A space for a snapshot ID is provided, but this particular example does not include such an ID. Then, metadata of data streams is provided after the "data" label. There are two streams identified by types (VADP and S3) and specific URIs identifying the streams. Elements of such state documents are described in greater detail herein.

In some examples, serializing a PE (e.g., PE 102) includes preserving the state document of the PE and collapsing some or all links or other dynamic portions of the data streams of the PE into references to the serialized version of the PE. It should be understood that serialization of a PE may be performed in any manner understood by a person of ordinary skill in the art without departing from the description herein, and serialization APIs and/or other serialization methods of PEs may be configured to perform a default serialization process or a serialization process that is specifically configured for the PE (e.g., specific serialization processes for handling dynamically linked data of data streams, specific arrangements of component PEs, etc.).

To restore a PE (e.g., PE 102), the state document of the serialized version of the PE is deserialized into the system. The state document will be the same as the state document that was originally stored in the PE prior to serialization. However, the URIs (e.g., links, addresses, data locations) for different data components may change. For instance, if the data has been stored as multiple streams rather than as a unified stream, the URIs of such streams may be different after deserialization, though the structure of the PE remains the same. A unified stream in the state document refers to the data for each component with a stream-relative URI (e.g., ZIP://<path>) in the serialized version of the PE, so such URIs may be altered during the deserialization process to restore the structure of the PE.

Further, during deserialization and/or restoration of a PE 102, new data objects (e.g., component PEs 112-114) are created as the state document 106 is instantiated. Those newly created objects deserialize associated metadata and data from the stream specified for them. Each object is provided a sub-portion of data for deserialization. Such objects may deserialize the data of the PE in parallel as described herein.

In some examples, a PE 102 is continuously replicated based on the associated application or VCI. The state document 106 of the PE 102 is configured to contain URIs of event streams that can be streamed into the PE 102 in real-time or near-real-time, enabling the PE 102 to remain in sync with the source VCI.

Alternatively, or additionally, data protection using the PE 102 may be driven by policies set to apply to the particular entity or multiple entities of the environment. For instance, a policy may be defined to perform a backup of an entity using the PE 102 every day. Other policies may include replicating a PE 102 to a remote site at a scheduled time and/or taking a local snapshot of the entity using the PE 102 APIs every ten minutes. A policy set to apply to a single application or entity also applies to all entities that are components of the application or entity (e.g., the data protection policy applies to all component PEs of the top-level PE).

Figure 2:
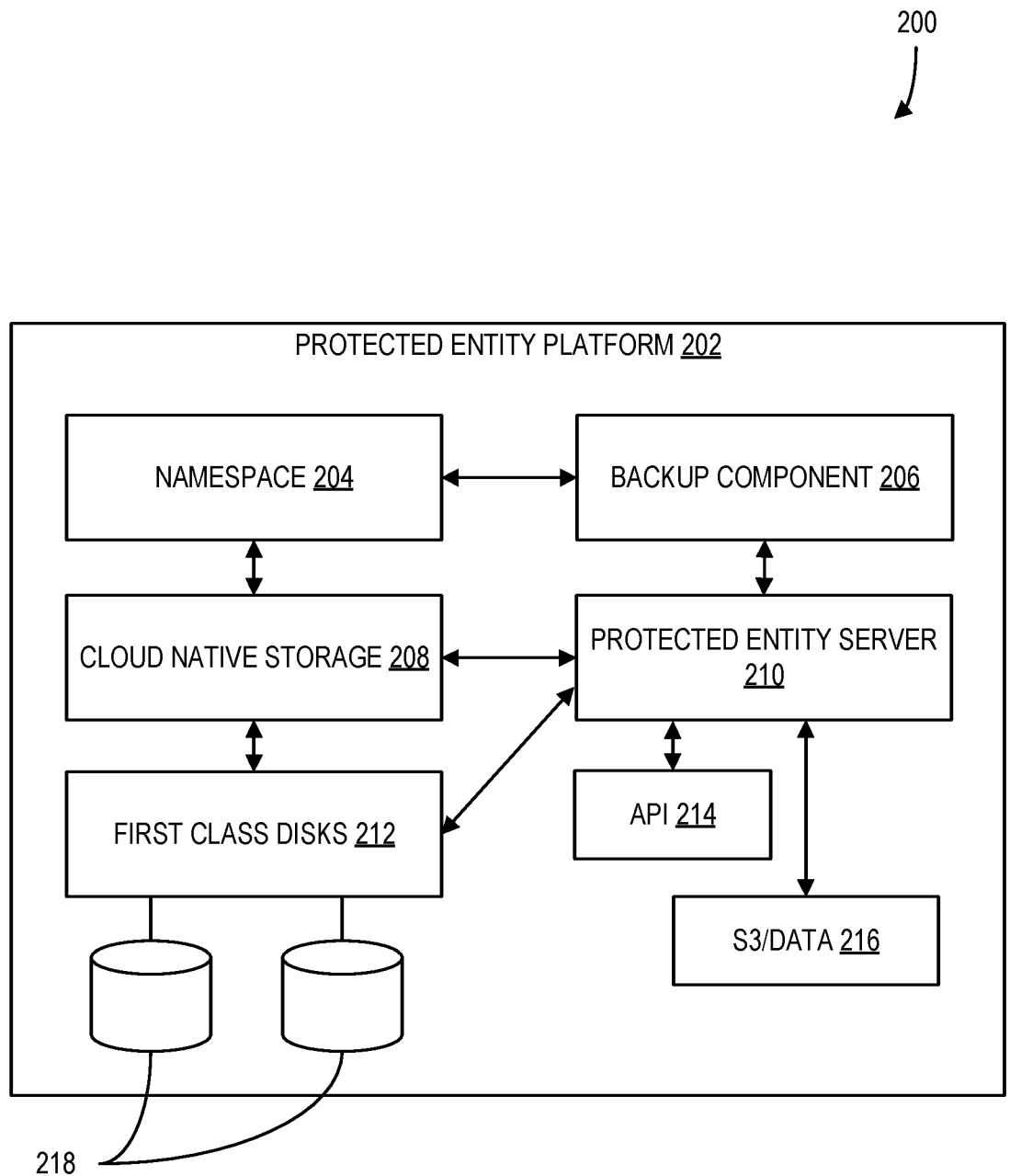
FIG. 2 is a block diagram illustrating a system configured for generation and use of PEs according to an embodiment.

FIG. 2 is a block diagram illustrating a system 200 configured for generation and use of PEs according to an embodiment. The system 200 of FIG. 2 includes a protected entity platform 202 (e.g., a VSPHERE platform) configured to backup, restore, and snapshot a namespace 204 of containers, applications, or other VCIs (e.g., a KUBERNETES namespace) using the protected entity framework as described herein. The platform 202 is configured to: expose the namespace 204 serialization and deserialization functions; leverage a backup component 206 (e.g., a VELERO component) to backup/restore the namespace 204 metadata; use disks (e.g., cloud native storage (CNS) 208 and/or first class disks (FCDs) 212 on physical disks 218) associated with the platform 202 to backup, restore, and/or snapshot disk-stored data; expose, via a protected entity server, or PE server, 210, the namespace 204 via an S3 API 216 or other similar API under an associated bucket; and expose the PE platform APIs 214 via its own PE server 210 (e.g., a Representational State Transfer (REST) server or other similar server).

In some examples, the PE server 210 of FIG. 2 includes an API server that provides the control path interface for the disclosed platform 202. In some examples, the API server is implemented via SPRING applications (or other frameworks) in a LADON server (or other cloud repository). The functions provided by the server include listing PEs (e.g., disks, VMs, VCIs and/or KUBERNETES namespaces), snapshotting PEs, listing available snapshots of PEs, and retrieving PE graphs for snapshot (e.g., in a JavaScript Object Notation (JSON) file).

In some examples, the PE server 210 includes the following REST APIs:
URI: /api/
GET—Returns the list of services (disks, VMs, VCIs, KUBERNETES)
URI: /api/<service>
GET—Returns the list of PEs in the service (Disk IDs, VM and/or VCI references, KUBERNETES namespaces)
POST—Triggers a restore of the service. A JSON of the PE is posted with URIs of the metadata, data, etc. as it is to be restored.
URI: /api/<service>/<ID>
GET—Returns the JSON of the PE associated with the ID (metadata, list of URIS for metadata, data)
GET ?action=snapshot—Takes a snapshot and returns the snapshot ID. All component PEs are snapshotted as well.
URI: /api/<service>/<ID>/snapshots
GET—Lists all the snapshots for the PE
URI: /api/<service>/<ID>/snapshots/<snapshot ID>
GET—Returns the JSON for the snapshot. This returns the metadata of the PE as it was at the time of the snapshot. The URIs in the JSON will be for the snapshots of the component PEs.
DELETE—Removes the snapshot In some examples, the PE server 210 provides access to data, metadata, and combined data for PEs via the S3 protocol. It should be understood that, in other examples, other protocols may be used by the PE API server 210 without departing from the description herein. However, in the illustrated example of FIG. 2, the S3 server is coupled tightly with the API server 210, but this is not required. The data provided by the S3 server is not a copy of existing data but, instead, the S3 server provides a method of accessing the existing data via S3/data API 216. For example, accessing a virtual disk through the S3 API 216 reads the data from the virtual disk using the VADP APIs. The combined data stream in a zip file or other archive file is assembled on request and not stored on disk for extended periods.

In some examples, each service or type of service is assigned its own S3 bucket, which shows up as part of the path URL. PE data may be accessed as follows:

Raw data for the object—/api/s3/<service>/<service id>

Combined zip file including metadata, PE info, raw data and combined zip files from all component PEs—/api/s3/<service>/<service id>.zip Metadata for the object (this is service specific, not the PE info)—/api/s3/<service>/<service id>.md The S3 API 216 is also the restore interface. Uploading a zip file into the restore bucket causes the PEs described in the zip file to be reconstituted. The data for the entities may be contained in the zip file or it may be accessed via URIs defined in the graph JSON data for the PEs.

In some examples, the graph of protected entities may include an ISTIO-based graph, such that the ISTIO-based graph is treated as a top-level PE and serves as the service mesh definition of other PEs on levels below the graph. Such a graph may be used to control and/or monitor the activities of the PEs that are in the graph.

In some examples, PEs include data in one or more of the following described formats. For instance, a PE identifier (PE ID) includes a type identifier, an identifier for the object, and an optional snapshot ID formatted as: <type>:<id>[:<snapshot ID>]. A virtual disk may be referred to as: ivd:<disk ID value>, where "ivd" indicates an improved virtual disk (IVD) type and the disk ID value is a unique identifier of the virtual disk. A snapshot on that disk may be identified as: ivd:<disk ID value>:<disk snapshot ID value>, where the disk snapshot ID value uniquely identifies a snapshot of the disk (e.g., among other snapshots).

In another example, a KUBERNETES namespace is referred to as: k8s:<namespace ID value>, where "k8s" indicates the KUBERNETES namespace type and the namespace ID value uniquely identifies the namespace. A snapshot of the namespace is referred to as: k8s:<namespace ID value>:<namespace snapshot ID value>, where the namespace snapshot ID value uniquely identifies a snapshot of the KUBERNETES namespace.

In some examples, PEs generate or otherwise include JSON files or data that describe the PE from the point-of-view of the PE platform 202. This JSON can be viewed as a description of the state of the PE at a point in time. This state is used for both backup and restore, as well as other operations. An example of such formatted JSON data is provided below:

```
{
"id":"<protected entity ID>",
"name":"<protected entity name>",
"dataURIs":[
"<data URI>"
],
"metadataURIs": [
"<metadata URI>"
],
"combinedURIs":[
"<combined URI>"
],
"components":[
"<component protected entity id>"
]
}
```

An example JSON for a single KUBERNETES namespace is provided below:

```
{
metadataURIs:[
"http://10.0.0.1/api/s3/k8s/k8s:nginx-example:0ce7b1ca-43cc-4ec2-8ed7-cf58ce0951aa.md"
],
components:[
"ivd:e1c3cb20-db88-4c1c-9f02-5f5347e435d5:67469e1c-50a8-4f63-9a6a-ad8a2265197c"
],
dataURIs:[
],
combinedURIs:[
" "
],
name:"nginx-example",
id:"k8s:nginx-example"
}
```

In some examples, PE combined data is accessible in an archive file format, such as a zip file format. Combined information for a PE including the PE JSON file(s), data and component combined data stream and/or information is provided in a ZIP file or other archive file type that easily combines multiple files with a directory structure and that does not require the length of entries to be known when the entry header is written. As a result, component PE data can be embedded in a zip file even when the length of the component's data is unknown until after the data has been read. Each combined data zip file contains the PE JSON file, the PE metadata, the data of the PE, and the component PE directory. The PE JSON file is required. This file includes data and metadata URIs that are relative to the zip or archive file. For instance, a data URI may be "zip://<PE ID>.data". This portion may be accessed by "/<PE ID>.peinfo". The PE metadata is optional, as not all PEs include metadata. The metadata portion may be accessed by "/<PE ID>.md". The data of the PE is optional, as not all PEs include data (e.g., a KUBERNETES namespace has only metadata). The data portion may be accessed by "/<PE ID>.data". The component PE directory is required if the PE has component PEs. A components directory is configured to include zip files or other archive files for each of the component PEs referred to by the PE. This directory may be accessed by "/components/<component PE ID>.zip".

In some examples, data and metadata of a PE are referred to by URIs such as URLs or other links or file locations. For instance, URIs of a PE may be configured to point to files accessibly via S3 and/or HTTP protocols. In some examples, the PE framework described herein uses one or more of several specific URI types, such as ZIP file-relative URIs, VADP URIs, IVD URIs, and/or Elastic Block Store (EBS) URIs. ZIP file-relative URIs are used to reference data and/or metadata with in zip files or similar archives. They may be represented by "zip://<path within zip file>".VADP URIs are used to reference data that can be retrieved using the VADP APIs and transports. For instance, an IVD snapshot can be accessed by "vapd://ivd/<ivd ID>:<snapshot ID>". IVD URIs are used to indicate that the data source is an IVD. Other disk types may also be used without departing from the description. These URIs are not returned by the EP system since there is no outward transport protocol available. However, for restoring, these URIs can be used to indicate the disk that should be used for the protected entity. This allows a backup application to restore data into an IVD without using any EP system transports and then present that as data to be restored. Such a URI may appear as "ivd://<ivd ID>:<snapshot ID>". EBS URIs are similar to IVD URIs in that these URIs indicate that the data source is an EBS and they can be used to specify a data store during restore operations. Such a URI may appear as "ebs://<ebs ID>:<snapshot ID>".

In some examples, an S3 server provides the data path for the described PE framework. However, it should be understood that other types of servers may be used in other examples without departing from the description herein. The S3 server is implemented as an S3 repository that provides the following functionality:

Retrieving metadata for IVDs (FCDs), VMs, KUBERNETES namespaces, and other VCIs

Retrieving data for IVDs, VMs, KUBERNETES namespaces, and other VCIs

Retrieving unified or combined streams for IVDs, VMs, KUBERNETES namespaces, and other VCIs Restoring a PE from a data stream (e.g., a data stream including a serialized version of the PE)

The backup component 206 (e.g., a VELERO component) of the system of FIG. 2 provides the mechanisms to gather namespace metadata (e.g., KUBERNETES metadata) together from the namespace(s) and also restore namespaces that have been backed up. It should be understood that, in other examples, other backup/restore tools may be used without departing from the description herein. When the backup component 206 captures S3 metadata, it stores it to an S3 bucket. The backup component 206 may be configured to store backups on a PE framework-based server or on another server (e.g., a cloud server). Interaction with the backup component 206 server may be based on configuration of the BackupStorageLocation of VELERO and/or APIs (e.g., a RESTful server and/or library). Further, as illustrated, VSPHERE and CNS/FCD are used to run the namespace 204 and provide storage to the namespace 204.

In some examples, a KUBERNETES namespace 204 of the system of FIG. 2 is backed up according to the following workflow. Via the unified stream API, a snapshot of the namespace is created (e.g., "GET/k8s/<namespace ID>?action=snapshot"). This triggers a VELERO backup component 206 to do a backup without snapshots by calling the VELERO command line "velero backup create myBackup -include-namespaces=targetNS -snapshot-volumes=false -wait". The VELERO information is saved into the S3 server. When the command line finishes, the KUBERNETES namespace information is retrieved and parsed for persistent volumes (PVs). The PVs are translated to FCDs and then all of the FCDs are snapshotted. The VELERO information, FCD snapshot IDs, etc. are stored as the snapshot information.

The generated snapshot JSON is then retrieved (e.g., "GET /api/<service>/<ID>/snapshots/<snapshot ID>"). Further, the unified or combined data stream of the KUBERNETES namespace 204 being backed up is retrieved. The JSON lists the URIs of the KUBERNETES namespace 204 PE and the unified data stream is in the form of a zip file (e.g., /s3/k8s/k8s/<pe ID>.zip). Retrieving the unified URI causes the snapshot information to be accessed. The default serializer then creates a zip file data stream for use in the backup process. The zip file may be stored to local disk or to another disk of the system.

In a further example, the backed-up KUBERNETES namespace 204 is restored. The JSON of the PE of the namespace 204 to be restored is placed in the location "/KUBERNETES/<cluster ID>", which is a location that indicates the PE is to be restored. The JSON may not be the same JSON that was retrieved because the PE information is changed for each PE to indicate the data source. Potential data sources include S3 URIs (where the PE's data was stored, rather than where it originated from), FCD IDs/snapshot IDs (used to restore from snapshots that have not been offloaded), and/or EBS IDs/snapshot IDs (used for restoring from EBS snapshots). The S3 URI is not required to restore the PE, but at least one URI provided must be supported by the restore mechanism. Upon retrieving the JSON, the PE platform 202 triggers a KUBERNETES PE deserializer (e.g., a deserialization API 116) and the component PEs of the KUBERNETES namespace are restored, resulting in new FCD IDs. New KUBERNETES PVs are created for each FCD ID and the VELERO metadata is updated with the new PVs. The VELERO component is then triggered to restore with the modified VELERO metadata. This causes the KUBERNETES namespace 204 to be instantiated with the storage and metadata defined in the JSON. The restoration may also include restoring data that is included in the zip file.

In some examples, the described disclosure further provides incremental backup, such that backing up an entity as PE includes retrieving change data associated with changes that have occurred to the entity since a previous backup point-in-time. Such incremental backup may include changed-block tracking (e.g., VADP-style), providing a data stream that contains a changed block map and associated changed blocks, providing a data stream that contains changed files, or other methods of providing such change data.

Figure 3:
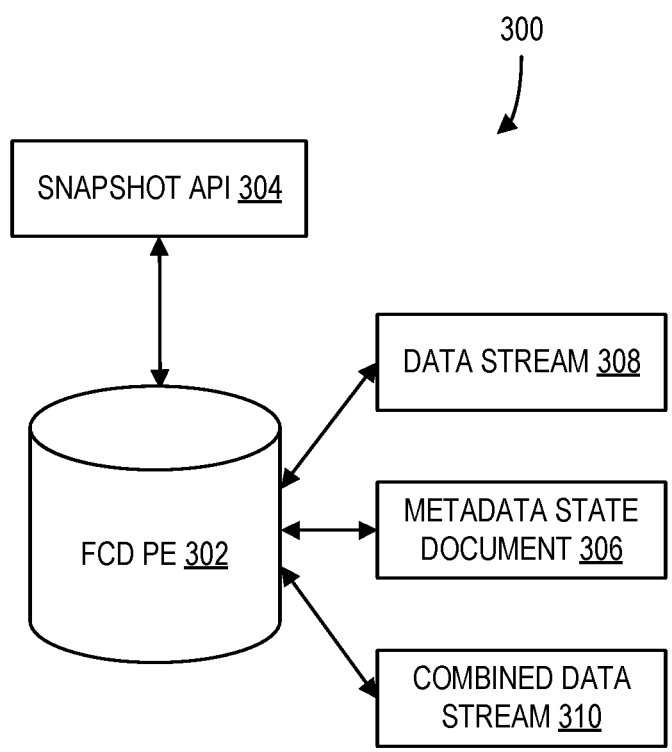
FIG. 3 is a block diagram illustrating a configuration of a first class disk (FCD) as an FCD PE according to an embodiment.

FIG. 3 is a block diagram illustrating a configuration of an FCD as a PE 302 according to an embodiment. An FCD is a single VSPHERE virtual disk, but it should be understood that, in other examples, a PE may be used to represent other types of disks without departing from the description herein. A snapshot of the FCD PE 302 may be generated and/or otherwise used via the snapshot API 304 as described herein. The data object of the disk (e.g. the vStorageObject) is serialized into YAML format and is available as part of the PE metadata state document 306 via an S3 API. The data in the disk is available via the data stream 308 (e.g., S3 API and also via VADP). The combined data stream 310 is available via the S3 API and is returned as an archive file (e.g., zip file) containing the disk state document and the disk data.

Figure 4:
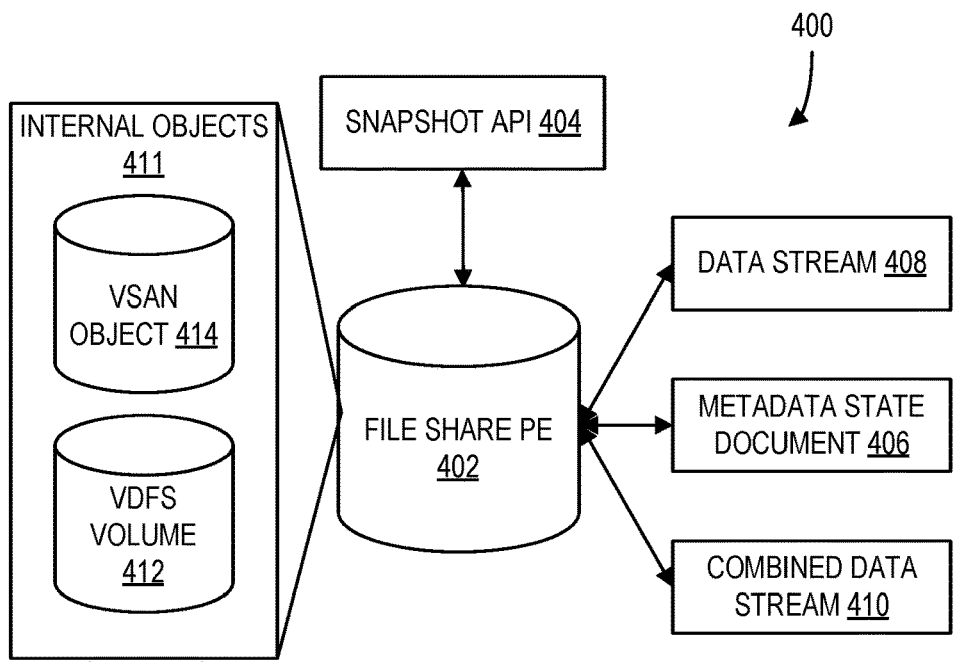
FIG. 4 is a block diagram illustrating a configuration of a file share as a file share PE according to an embodiment.

FIG. 4 is a block diagram illustrating a configuration of a file share (e.g., a virtual storage area network (vSAN) file services share) as a file share PE 402 according to an embodiment. The file share PE 402 includes a snapshot API 404, a metadata state document 406, a data stream 408, and a combined data stream 410 as described herein. In some examples, internally, the file share is provided by a vSAN object 414 that contains a vSAN Distributed File System (VDFS) volume 412 with the protocol stack running a system VM. These internal objects 411 are not exposed in the PE metadata state document 406, as illustrated by the box surrounding the VDFS volume and the vSAN object. The share metadata is serialized into YAML format and is available as part of the metadata state document 406 via S3 API. The data in the share is available via the S3 API and also via network file system (NFS) and/or server message block (SMB) protocols. Unlike the FCD of FIG. 3 described above, however, the data of the data stream 408 returned from the S3 API is not the raw contents of the share's vSAN objects but an archive file (e.g. a tape archive (TAR) file) of the share. The combined data stream 410 is available via the S3 API and is returned as a zip file or other archive file containing the PE metadata state document 406 and the share archive file of the data stream 408. Alternatively, or additionally, the file share PE 402 may make use of protocols specific to the file share configuration, such as Network Data Management Protocol (NDMP). In other examples, it should be understood that the described disclosure may be configured to use and/or be compatible with a Virtual Machine File System (VMFS), a Virtual Volume (VVOL) system, and/or other types of storage systems without departing from the description herein.

Figure 5:
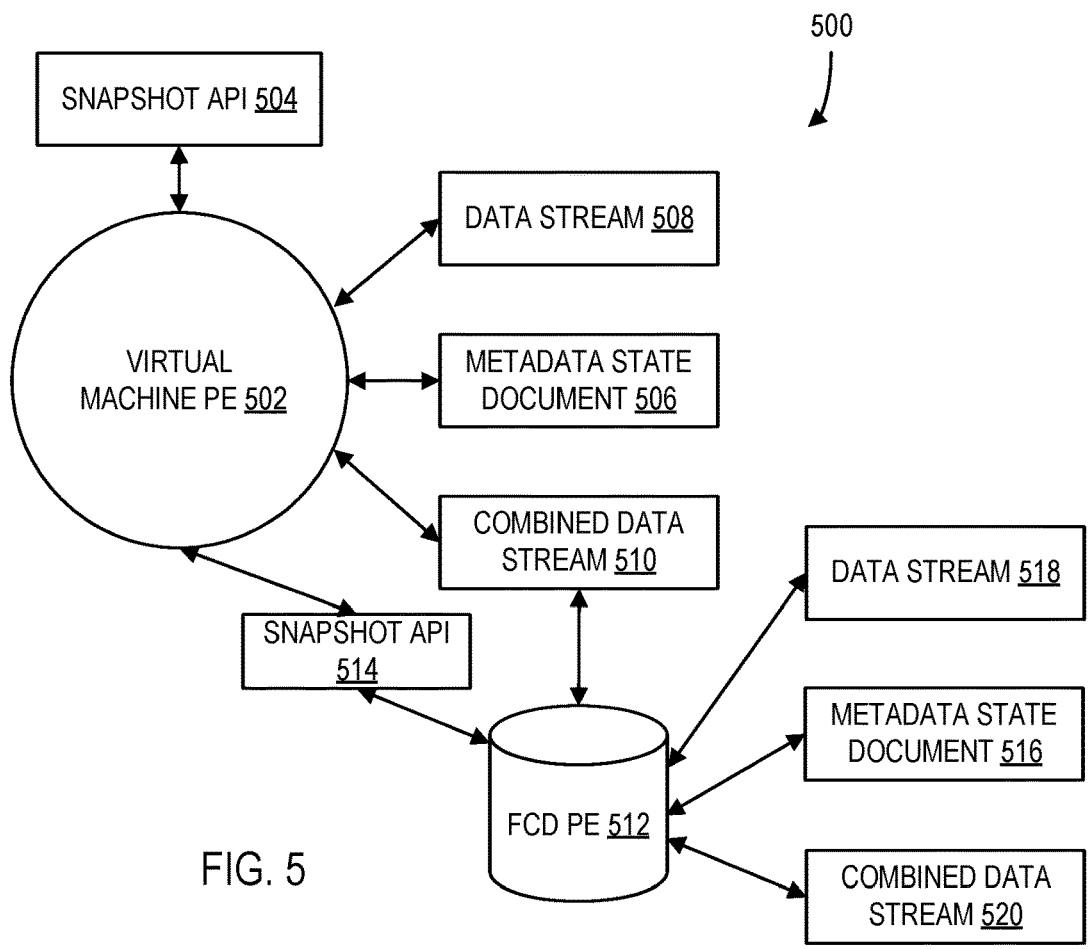
FIG. 5 is a block diagram illustrating a configuration of a virtual machine as a VM PE according to an embodiment.

FIG. 5 is a block diagram illustrating a configuration of a virtual machine as a VM PE 502 according to an embodiment. The described VM is exposed as a PE 502 addressable by a managed object ID (moID) through the S3 API. A snapshot of the VM PE 502 is accessible via the snapshot API 504 as described herein. The VM object is serialized into YAML format and is available as part of the PE metadata state document 506 via an S3 API. The component virtual disks are treated as FCDs (e.g., the FCD PE 512) and their metadata state documents (e.g., metadata state document 516) are combined into the VM's metadata state document 506. The VM's data stream 508 is available via the S3 API and returns a zip file containing the non-volatile random-access memory (NVRAM) contents, swap file contents, suspended state, snapshot state and/or snapshot memory contents (if memory was part of the snapshot). The combined stream 510 is available via the S3 API and is returned as a zip file containing the VM metadata state document 506, the VM data zip file of the data stream 508, as well as the combined streams (e.g., combined stream 520, which contains data stream 518 and metadata data state document 516) from all component virtual disks. Snapshot APIs (e.g., snapshot API 514) of the component virtual disks may be accessed by the VM PE 502 for use in snapshotting the VM PE 502 itself.

Figure 6:
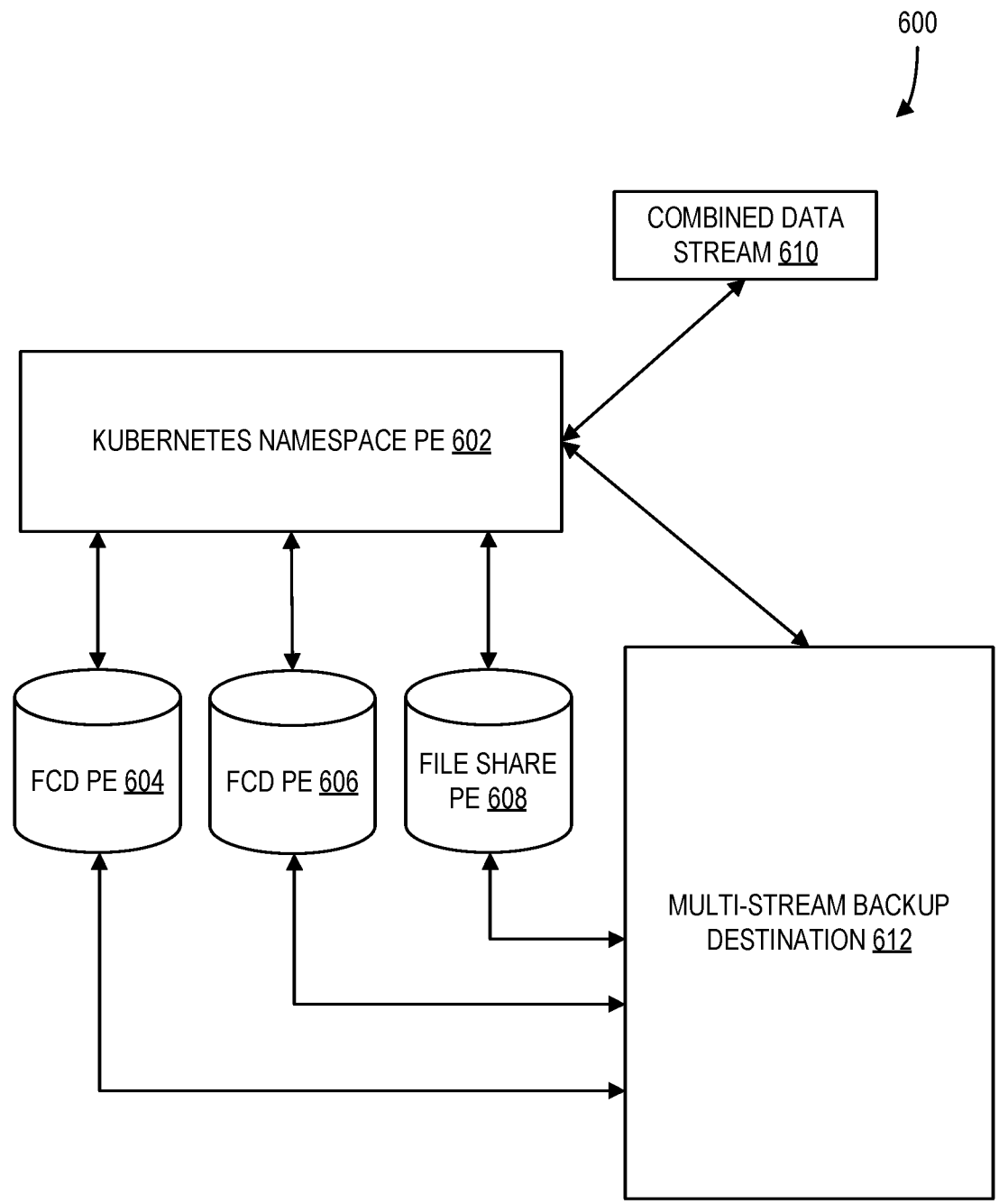
FIG. 6 is a block diagram illustrating a configuration of a KUBERNETES namespace with multiple components as a PE according to an embodiment.

FIG. 6 is a block diagram illustrating a configuration of a KUBERNETES namespace (e.g., a container-based environment namespace) with multiple components as a PE 602 according to an embodiment. The namespace includes the KUBERNETES configuration, container images, and persistent volumes. The KUBERNETES YAML is returned as an object in the PE YAML state document which is accessed via the S3 API. All persistent volumes are mapped to their PE equivalent (FCD/File Share in a VSPHERE installation) (e.g., FCD PE 604, FCD PE 606, and file share PE 608) and their state documents included in the namespace's state document, as described above with respect other exemplary PEs. The namespace's data stream is not implemented as the namespace does not have any of its own data. The combined data stream 610 is available via the S3 API and is returned as a zip file containing the namespace state document and the combined streams from all component PEs. A basic backup can copy the entire application via the S3 URI of the KUBERNETES node. A more sophisticated backup system can retrieve contents of individual PEs from the multistream backup destination 612.

Figure 7:
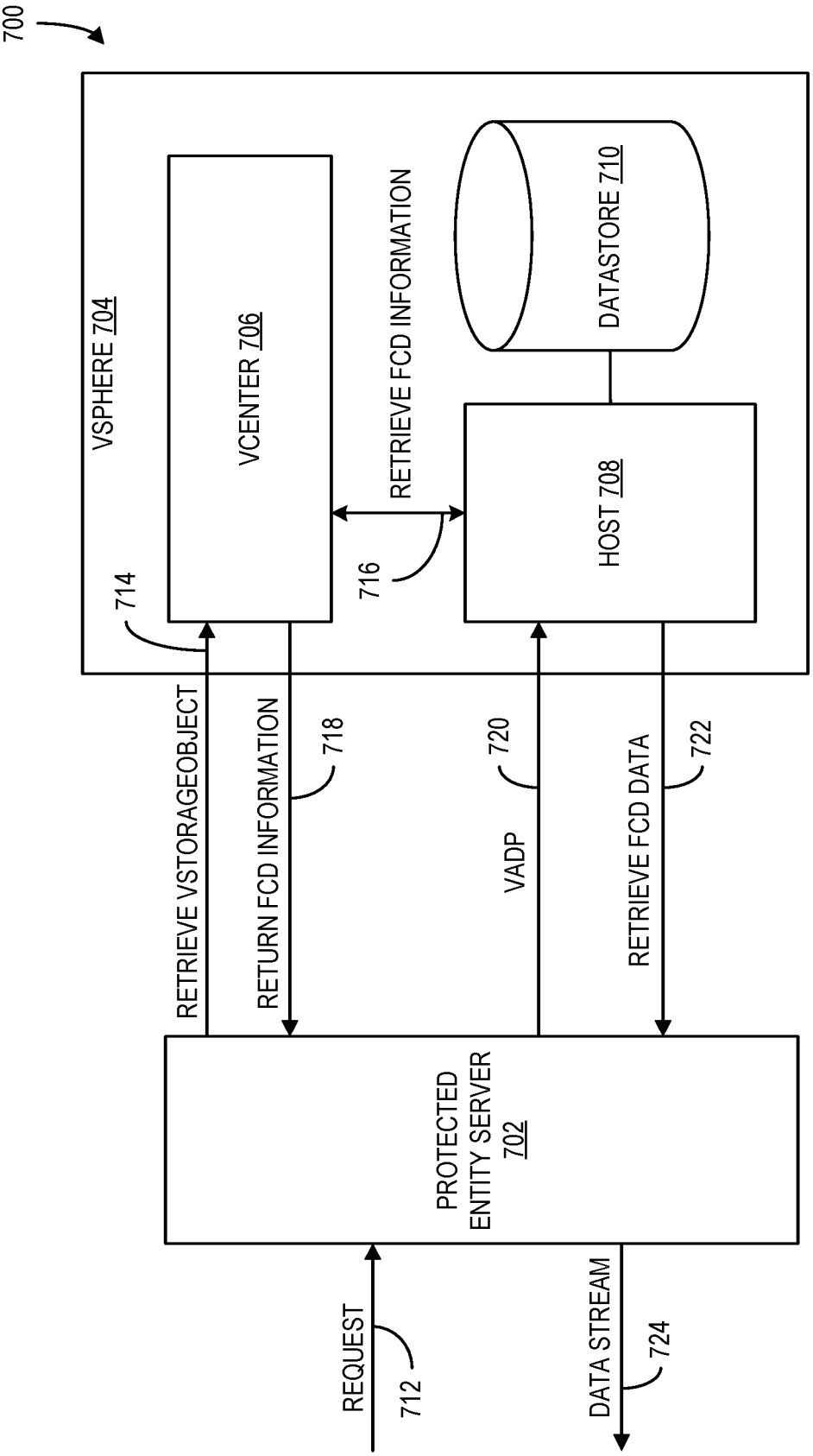
FIG. 7 is a block diagram illustrating a system configured for handling PEs according to an embodiment.

FIG. 7 is a block diagram illustrating a system 700 configured for handling PEs according to an embodiment. An S3 server running in a VM serves as the controller for a VCENTER 706. Data is retrieved from FCDs via VADP and exported via the S3 interface, both as the raw data stream and as the combined zip file. This approach allows the PE server 702 to be delivered independently of VCENTER and VSPHERE. Snapshotting FCDs and VMs is accomplished via the VSPHERE APIs. A KUBERNETES application implementation leverages the FCD PEs and performs basic snapshots of all volumes and metadata within the KUBERNETES namespace.

In some examples, the PE server 702 is based on a LADON S3 server, though it should be understood that the PE server 702 may be based on other types of servers without departing from the description herein. FIG. 7 illustrates an exemplary backup workflow of a PE. A request to backup an FCD PE may be outlined by the following API calls:

a) Retrieve the PE state document.
b) Access the PE data stream.
c) Persist or otherwise stream the PE data stream into a file or other persistent storage for a future restore operation.

The diagram of FIG. 7 is an example implementation of these operations. At 712, the PE server 702 accepts the request to backup an FCD with the UUID of the FCD specified in the URI. At 714, the metadata of the FCD is retrieved from the VCENTER server 706 of the VSPHERE 704 by invoking the "retrieveVStorageObject" API. At 716, the "retrieveVStorageObject" API retrieves the requested information from the host 708 and associated data store 710 and, at 718, the retrieved metadata is delivered back to the PE server 702. The data stream of the FCD is available through VADP and, at 720, the PE server 702 requests the FCD data stream through VADP. At 722, the FCD data stream is returned to the PE server 702 from the host 708. At 724, the retrieved data stream is returned in response to the backup request from 712.

Further, the combined data stream for the FCD may be accessed. When the URI for the combined data stream is invoked (e.g., <UUID>.zip), the FCD metadata is formatted into a YAML state document and it and the FCD data are returned in a zip-formatted data stream as described herein. The zip file is generated on request and is not stored in the PE server 702 in the long term.

Figure 8:
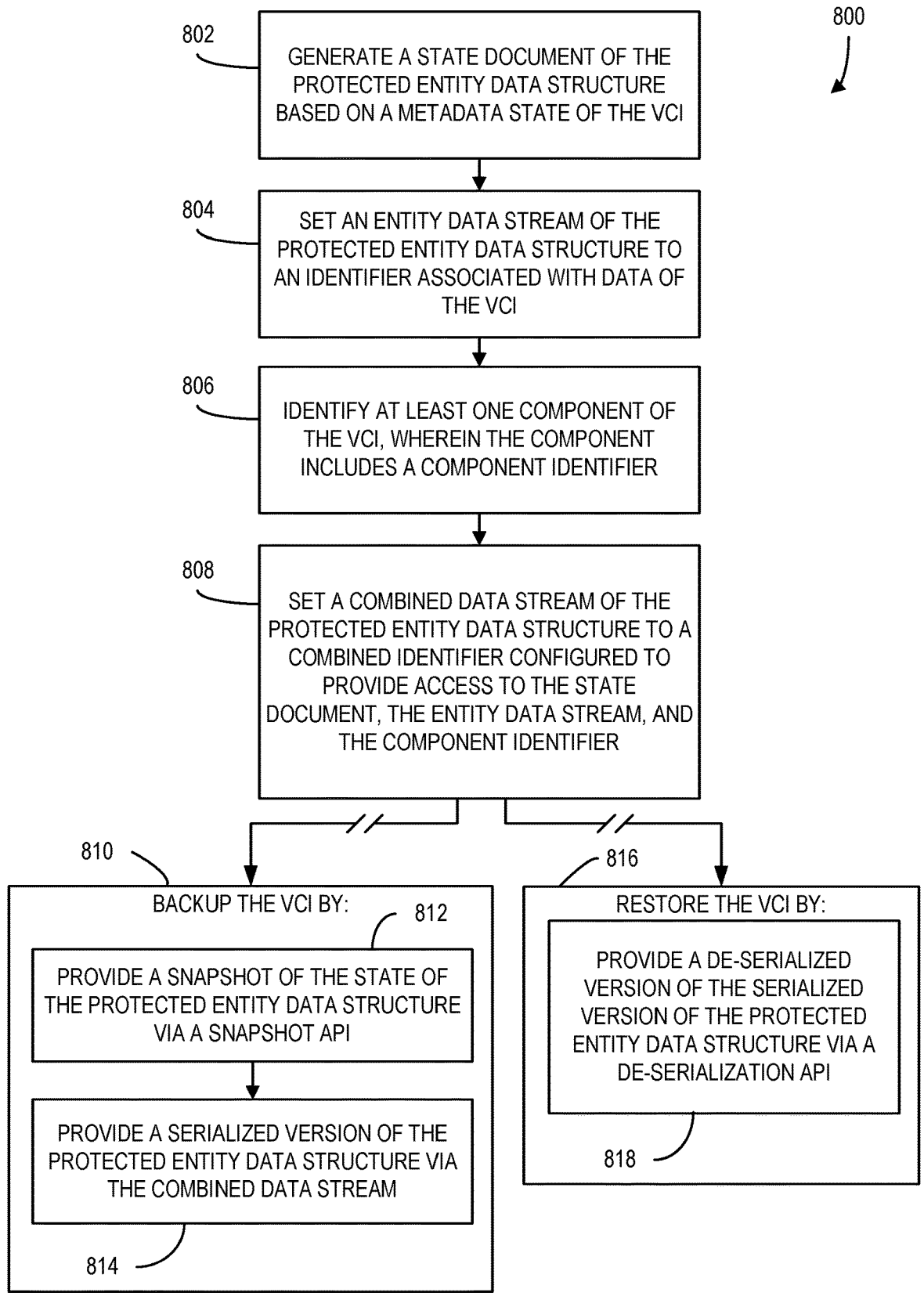
FIG. 8 is a flow chart illustrating a method of configuring a PE of a virtual computing instance (VCI) according to an embodiment.

FIG. 8 is a flow chart illustrating a method 800 of configuring a PE of a VCI according to an embodiment. In some examples, the method 800 is performed by a system such as system 200 of FIG. 2 described herein. At 802, a state document of the PE is generated based on a metadata state of the VCI. At 804, an entity data stream of the PE is set to a URI associated with data of the VCI. At 806, at least one component of the VCI is identified, wherein the at least one component includes a component URI. At 808, a combined data stream of the PE is set to a combined URI configured to provide access to the state document of the PE, the entity data stream of the PE, and the component URI of the at least one component of the VCI. At 810, the VCI is backed up based on the protected entity providing a snapshot of the state of the PE data structure via a snapshot API at 812 and providing a serialized version of the PE data structure via the combined data stream at 814. At 816, the VCI is restored based on the protected entity providing a de-serialized version of the serialized version of the PE data structure via a de-serialization API that is configured to convert a serialized version of the PE into a de-serialized version of the PE.

Exemplary Operating Environment

In virtualized examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, virtual machines (VMs) are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 9:
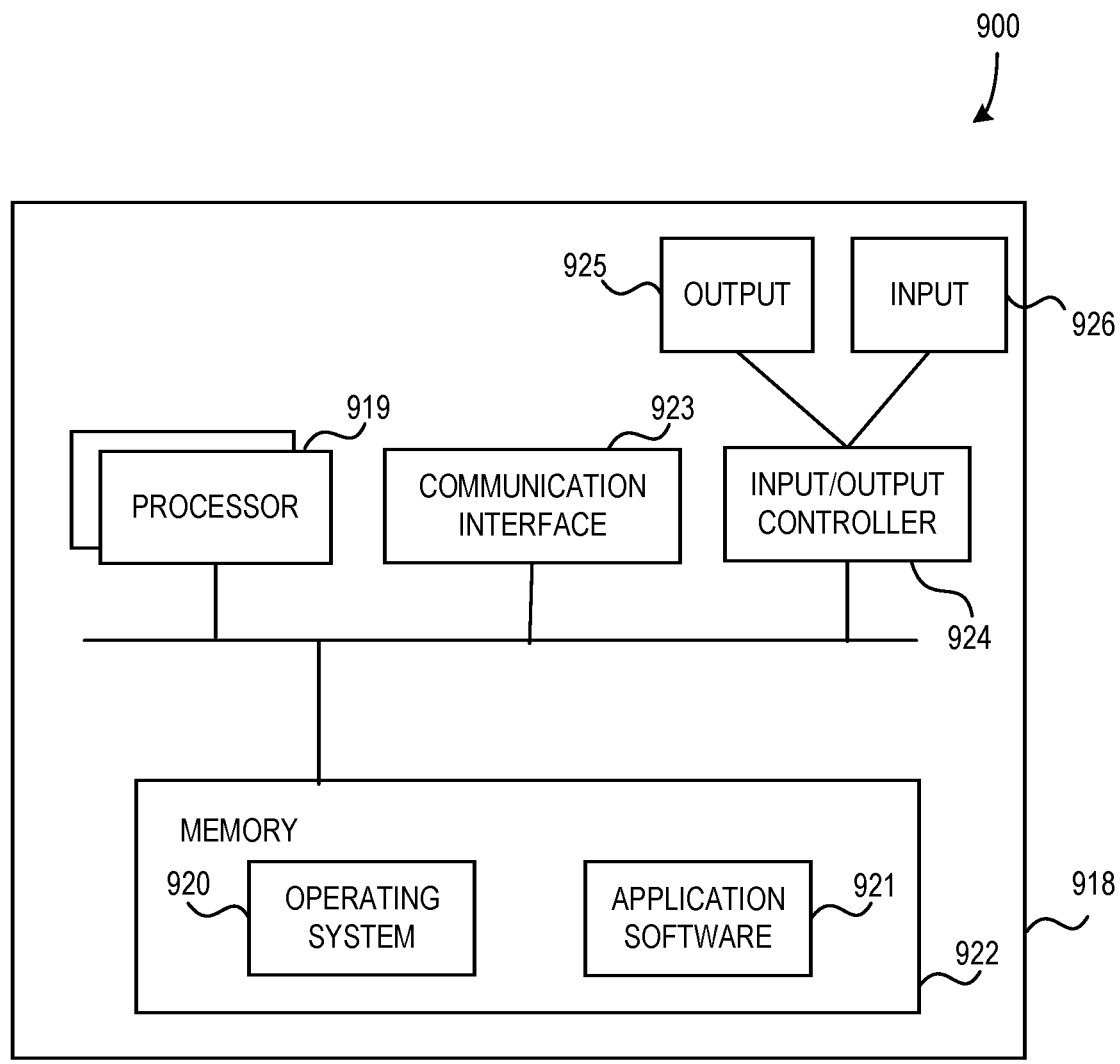
FIG. 9 illustrates a computing apparatus according to an embodiment as a functional block diagram.

The present disclosure is operable with a computing apparatus according to an embodiment as a functional block diagram 900 in FIG. 9. In an embodiment, components of a computing apparatus 918 may be implemented as a part of an electronic device according to one or more embodiments described in this specification. The computing apparatus 918 comprises one or more processors 919 which may be microprocessors, controllers or any other suitable type of processors for processing computer executable instructions to control the operation of the electronic device. Alternatively, or in addition, the processor 919 is any technology capable of executing logic or instructions, such as a hard-coded machine. Platform software comprising an operating system 920 or any other suitable platform software may be provided on the apparatus 918 to enable application software 921 to be executed on the device. According to an embodiment, creating and handling protected entities as described herein may be accomplished by software, hardware, and/or firmware.

Computer executable instructions may be provided using any computer-readable media that are accessible by the computing apparatus 918. Computer-readable media may include, for example, computer storage media such as a memory 922 and communications media. Computer storage media, such as a memory 922, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that the storage may be distributed or located remotely and accessed via a network or other communication link (e.g. using a communication interface 923).

The computing apparatus 918 may comprise an input/output controller 924 configured to output information to one or more output devices 925, for example a display or a speaker, which may be separate from or integral to the electronic device. The input/output controller 924 may also be configured to receive and process an input from one or more input devices 926, for example, a keyboard, a microphone or a touchpad. In one embodiment, the output device 925 may also act as the input device. An example of such a device may be a touch sensitive display. The input/output controller 924 may also output data to devices other than the output device, e.g. a locally connected printing device. In some embodiments, a user may provide input to the input device(s) 926 and/or receive output from the output device(s) 925.

The functionality described herein can be performed, at least in part, by one or more hardware logic components. According to an embodiment, the computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; at least one memory comprising computer program code, the at least one memory and the computer program code configured to, with the at least one processor, cause the at least one processor to: generate a state document of the protected entity data structure based on a metadata state of the VCI; set an entity data stream of the protected entity data structure to a uniform resource identifier (URI) associated with data of the VCI; identify at least one component of the VCI, wherein the at least one component includes a component URI; set a combined data stream of the protected entity data structure to a combined URI configured to provide access to the state document, the entity data stream, and the component URI; perform a backup of the VCI by: providing a snapshot of the state of the protected entity data structure based on current states of the state document of the VCI, the data of the VCI, and the at least one component of the VCI, via a snapshot application program interface (API); and providing a serialized version of the protected entity data structure including serialized versions of the state document of the VCI, the data of the VCI, and the at least one component of the VCI, via the combined data stream; and restore the backup of the VCI by: providing, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

A computerized method for backing up and restoring a VCI using a protected entity data structure, the method comprising: generating, by a processor, a state document of the protected entity data structure based on a metadata state of the VCI; setting, by the processor, an entity data stream of the protected entity data structure to a URI associated with data of the VCI; identifying, by the processor, at least one component of the VCI, wherein the at least one component includes a component URI; setting, by the processor, a combined data stream of the protected entity data structure to a combined URI configured to provide access to the state document, the entity data stream, and the component URI; performing, by the processor, a backup of the VCI by: providing, by the processor, a snapshot of the state of the protected entity data structure based on current states of the state document of the VCI, the data of the VCI, and the at least one component of the VCI, via a snapshot application programming interface (API); and providing, by the processor, a serialized version of the protected entity data structure including serialized versions of the state document of the VCI, the data of the VCI, and the at least one component of the VCI, via the combined data stream; and restoring, by the processor, the backup of the VCI by: providing, by the processor, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

One or more non-transitory computer storage media having computer-executable instructions for backing up and restoring a VCI using a protected entity data structure that, upon execution by a processor, cause the processor to at least: generate a state document of the protected entity data structure based on a metadata state of the VCI; set an entity data stream of the protected entity data structure to a URI associated with data of the VCI; identify at least one component of the VCI, wherein the at least one component includes a component URI; set a combined data stream of the protected entity data structure to a combined URI configured to provide access to the state document, the entity data stream, and the component URI; perform a backup of the VCI by: providing a snapshot of the state of the protected entity data structure based on current states of the state document of the VCI, the data of the VCI, and the at least one component of the VCI, via a snapshot application programming interface (API); and providing a serialized version of the protected entity data structure including serialized versions of the state document of the VCI, the data of the VCI, and the at least one component of the VCI, via the combined data stream; and restore the backup of the VCI by: providing, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

Alternatively, or in addition to the other examples described herein, examples include any combination of the following:
  wherein providing a serialized version of the protected entity data structure via the combined data stream further includes: generating, by the processor, a serialized version of the protected entity data structure based on the combined data stream; identifying, by the processor, at least one component of the VCI based on a combined data stream of the protected entity data structure; generating, by the processor, at least one serialized component version using at least one data stream of the identified at least one component; and adding, by the processor, the generated at least one serialized component version to the serialized version of the protected entity data structure.

wherein providing, via the de-serialization API, a de-serialized version of the serialized version of the protected entity data structure further includes: obtaining, by the processor, a stored serialized version of the protected entity data structure from a backup data store; converting, by the processor, the obtained serialized version of the protected entity data structure into a de-serialized version of the protected entity data structure using the de-serialization API; identifying, by the processor, the at least one serialized component version of the at least one component of the protected entity data structure in the obtained serialized version of the protected entity data structure; converting, by the processor, the identified at least one serialized component version of the at least one component into at least one de-serialized component version of the at least one component using at least one de-serialization API of the at least one component; and linking, by the processor, the at least one de-serialized component version of the at least one component to a combined data stream of the de-serialized version of the protected entity data structure.

wherein at least one of the snapshot API or the de-serialization API includes an API configured to be specific to the VCI that overrides a default API.

wherein the data of the VCI includes at least a first portion of data that is configured to be exposed to the protected entity data structure and at least a second portion of data that is configured to be inaccessible to the protected entity data structure; and wherein the computerized method further comprises accessing data of the VCI via the entity data stream of the protected entity data structure using the URI associated with the data of the VCI, wherein the accessed data includes the first portion of data configured to be exposed to the protected entity data structure and does not include the second portion of data configured to be inaccessible to the protected entity data structure.

further comprising accessing, by the processor, the combined data stream of the protected entity data structure of the VCI, wherein accessing the combined data stream of the protected entity data structure of the VCI includes causing an archive file of the combined data stream to be assembled, the archive file including the state document, the entity data stream, and at least one archive file associated with the identified at least one component of the VCI; and providing the assembled archive file in response to accessing the combined data stream of the protected entity data structure of the VCI.

wherein the VCI is a container-based environment namespace and the identified at least one component of the VCI includes a plurality of virtual drive components, wherein the combined data stream of the protected entity provides access to a plurality of component URIs of the plurality of virtual drive components, each component URI of the component URIs identifying a combined URI of an associated protected entity data structure of a virtual drive component of the plurality of virtual drive components.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for generating, by a processor, a state document of the protected entity data structure based on a metadata state of the VCI; exemplary means for setting, by the processor, an entity data stream of the protected entity data structure to a URI associated with data of the VCI; exemplary means for identifying, by the processor, at least one component of the VCI, wherein the at least one component includes a component URI; exemplary means for setting, by the processor, a combined data stream of the protected entity data structure to a combined URI configured to provide access to the state document, the entity data stream, and the component URI; exemplary means for performing, by the processor, a backup of the VCI by: providing, by the processor, a snapshot of the state of the protected entity data structure based on current states of the state document of the VCI, the data of the VCI, and the at least one component of the VCI, via a snapshot application programming interface (API); and providing, by the processor, a serialized version of the protected entity data structure including serialized versions of the state document of the VCI, the data of the VCI, and the at least one component of the VCI, via the combined data stream; and exemplary means for restoring, by the processor, the backup of the VCI by: providing, by the processor, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for backing up and restoring a virtual computing instance (VCI) using a protected entity data structure, the system comprising:
    at least one processor;
    at least one memory comprising computer program code, the at least one memory and the computer program code configured to, with the at least one processor, cause the at least one processor to:
    generate a state document of the protected entity data structure based on a metadata state of the VCI;
    set an entity data stream of the protected entity data structure to a uniform resource identifier (URI) associated with data of the VCI;
    identify at least one component of the VCI, wherein the at least one component includes a component URI;
    set a combined data stream of the protected entity data structure to a combined URI configured to provide access to the state document, the entity data stream, and the component URI;
    perform a backup of the VCI by:
        providing a snapshot of the state of the protected entity data structure based on current states of the state document of the VCI, the data of the VCI, and the at least one component of the VCI, via a snapshot application program interface (API); and
        providing a serialized version of the protected entity data structure including serialized versions of the state document of the VCI, the data of the VCI, and the at least one component of the VCI, via the combined data stream; and
    restore the backup of the VCI by:
        providing, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

2. The system of claim 1, wherein providing a serialized version of the protected entity data structure via the combined data stream further includes:
    generating a serialized version of the protected entity data structure based on the combined data stream;
    identifying at least one component of the VCI based on a combined data stream of the protected entity data structure;
    generating at least one serialized component version using at least one data stream of the identified at least one component; and
    adding the generated at least one serialized component version to the serialized version of the protected entity data structure.

3. The system of claim 2, wherein providing, via the de-serialization API, a de-serialized version of the serialized version of the protected entity data structure further includes:
    obtaining a stored serialized version of the protected entity data structure from a backup data store;
    converting the obtained serialized version of the protected entity data structure into a de-serialized version of the protected entity data structure using the de-serialization API;
    identifying the at least one serialized component version of the at least one component of the protected entity data structure in the obtained serialized version of the protected entity data structure;
    converting the identified at least one serialized component version of the at least one component into at least one de-serialized component version of the at least one component using at least one de-serialization API of the at least one component; and
    linking the at least one de-serialized component version of the at least one component to a combined data stream of the de-serialized version of the protected entity data structure.

4. The system of claim 1, wherein at least one of the snapshot API or the de-serialization API includes an API configured to be specific to the VCI that overrides a default API.

5. The system of claim 1, wherein the data of the VCI includes at least a first portion of data that is configured to be exposed to the protected entity data structure and at least a second portion of data that is configured to be inaccessible to the protected entity data structure; and
    wherein the at least one memory and the computer program code are configured to, with the at least one processor, further cause the at least one processor to access data of the VCI via the entity data stream of the protected entity data structure using the URI associated with the data of the VCI, wherein the accessed data includes the first portion of data configured to be exposed to the protected entity data structure and does not include the second portion of data configured to be inaccessible to the protected entity data structure.

6. The system of claim 1, wherein the at least one memory and the computer program code are configured to, with the at least one processor, further cause the at least one processor to:
    access the combined data stream of the protected entity data structure of the VCI, wherein accessing the combined data stream of the protected entity data structure of the VCI includes causing an archive file of the combined data stream to be assembled, the archive file including the state document, the entity data stream, and at least one archive file associated with the identified at least one component of the VCI; and provide the assembled archive file in response to accessing the combined data stream of the protected entity data structure of the VCI.

7. The system of claim 1, wherein the VCI is a container-based environment namespace and the identified at least one component of the VCI includes a plurality of virtual drive components, wherein the combined data stream of the protected entity data structure provides access to a plurality of component URIs of the plurality of virtual drive components, each component URI of the component URIs identifying a combined URI of an associated protected entity data structure of a virtual drive component of the plurality of virtual drive components.

8. A computerized method for backing up and restoring a VCI using a protected entity data structure, the method comprising:

generating, by a processor, a state document of the protected entity data structure based on a metadata state of the VCI;

setting, by the processor, an entity data stream of the protected entity data structure to a URI associated with data of the VCI;

identifying, by the processor, at least one component of the VCI, wherein the at least one component includes a component URI;

setting, by the processor, a combined data stream of the protected entity data structure to a combined URI configured to provide access to the state document, the entity data stream, and the component URI;

performing, by the processor, a backup of the VCI by:
  providing, by the processor, a snapshot of the state of the protected entity data structure based on current states of the state document of the VCI, the data of the VCI, and the at least one component of the VCI, via a snapshot application programming interface (API); and
  providing, by the processor, a serialized version of the protected entity data structure including serialized versions of the state document of the VCI, the data of the VCI, and the at least one component of the VCI, via the combined data stream; and restoring, by the processor, the backup of the VCI by:
  providing, by the processor, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

9. The computerized method of claim 8, wherein providing a serialized version of the protected entity data structure via the combined data stream further includes:

generating, by the processor, a serialized version of the protected entity data structure based on the combined data stream;

identifying, by the processor, at least one component of the VCI based on a combined data stream of the protected entity data structure;

generating, by the processor, at least one serialized component version using at least one data stream of the identified at least one component; and adding, by the processor, the generated at least one serialized component version to the serialized version of the protected entity data structure.

10. The computerized method of claim 9, wherein providing, via the de-serialization API, a de-serialized version of the serialized version of the protected entity data structure further includes:

obtaining, by the processor, a stored serialized version of the protected entity data structure from a backup data store;

converting, by the processor, the obtained serialized version of the protected entity data structure into a de-serialized version of the protected entity data structure using the de-serialization API;

identifying, by the processor, the at least one serialized component version of the at least one component of the protected entity data structure in the obtained serialized version of the protected entity data structure;

converting, by the processor, the identified at least one serialized component version of the at least one component into at least one de-serialized component version of the at least one component using at least one de-serialization API of the at least one component; and linking, by the processor, the at least one de-serialized component version of the at least one component to a combined data stream of the de-serialized version of the protected entity data structure.

11. The computerized method of claim 8, wherein at least one of the snapshot API or the de-serialization API includes an API configured to be specific to the VCI that overrides a default API.

12. The computerized method of claim 8, wherein the data of the VCI includes at least a first portion of data that is configured to be exposed to the protected entity data structure and at least a second portion of data that is configured to be inaccessible to the protected entity data structure; and
  wherein the computerized method further comprises accessing data of the VCI via the entity data stream of the protected entity data structure using the URI associated with the data of the VCI, wherein the accessed data includes the first portion of data configured to be exposed to the protected entity data structure and does not include the second portion of data configured to be inaccessible to the protected entity data structure.

13. The computerized method of claim 8, further comprising accessing, by the processor, the combined data stream of the protected entity data structure of the VCI, wherein accessing the combined data stream of the protected entity data structure of the VCI includes causing an archive file of the combined data stream to be assembled, the archive file including the state document, the entity data stream, and at least one archive file associated with the identified at least one component of the VCI; and providing the assembled archive file in response to accessing the combined data stream of the protected entity data structure of the VCI.

14. The computerized method of claim 8, wherein the VCI is a container-based environment namespace and the identified at least one component of the VCI includes a plurality of virtual drive components, wherein the combined data stream of the protected entity provides access to a plurality of component URIs of the plurality of virtual drive components, each component URI of the component URIs identifying a combined URI of an associated protected entity data structure of a virtual drive component of the plurality of virtual drive components.

15. One or more non-transitory computer storage media having computer-executable instructions for backing up and restoring a VCI using a protected entity data structure that, upon execution by a processor, cause the processor to at least:
- generate a state document of the protected entity data structure based on a metadata state of the VCI;
- set an entity data stream of the protected entity data structure to a URI associated with data of the VCI;
- identify at least one component of the VCI, wherein the at least one component includes a component URI;
- set a combined data stream of the protected entity data structure to a combined URI configured to provide access to the state document, the entity data stream, and the component URI;
- perform a backup of the VCI by:
  - providing a snapshot of the state of the protected entity data structure based on current states of the state document of the VCI, the data of the VCI, and the at least one component of the VCI, via a snapshot application programming interface (API); and
  - providing a serialized version of the protected entity data structure including serialized versions of the state document of the VCI, the data of the VCI, and the at least one component of the VCI, via the combined data stream; and
- restore the backup of the VCI by:
  - providing, via a de-serialization API, a de-serialized version of the serialized version of the protected entity data structure including a de-serialized version of the state document of the VCI, a URI configured to provide access to a de-serialized version of the data of the protected entity data structure, and a component URI configured to provide access to a de-serialized version of the at least one component of the VCI.

16. The one or more computer storage media of claim 15, wherein providing a serialized version of the protected entity data structure via the combined data stream further includes:
- generating a serialized version of the protected entity data structure based on the combined data stream;
- identifying at least one component of the VCI based on a combined data stream of the protected entity data structure;
- generating at least one serialized component version using at least one data stream of the identified at least one component; and
- adding the generated at least one serialized component version to the serialized version of the protected entity data structure.

17. The one or more computer storage media of claim 16, wherein providing, via the de-serialization API, a de-serialized version of the serialized version of the protected entity data structure further includes:
- obtaining a stored serialized version of the protected entity data structure from a backup data store;
- converting the obtained serialized version of the protected entity data structure into a de-serialized version of the protected entity data structure using the de-serialization API;
- identifying the at least one serialized component version of the at least one component of the protected entity data structure in the obtained serialized version of the protected entity data structure;
- converting the identified at least one serialized component version of the at least one component into at least one de-serialized component version of the at least one component using at least one de-serialization API of the at least one component; and
- linking the at least one de-serialized component version of the at least one component to a combined data stream of the de-serialized version of the protected entity data structure.

18. The one or more computer storage media of claim 15, wherein at least one of the snapshot API or the de-serialization API, includes an API configured to be specific to the VCI that overrides a default API.

19. The one or more computer storage media of claim 15, wherein the data of the VCI includes at least a first portion of data that is configured to be exposed to the protected entity data structure and at least a second portion of data that is configured to be inaccessible to the protected entity data structure; and
- wherein the computer-executable instructions, upon execution by the processor, further cause the processor to access data of the VCI via the entity data stream of the protected entity data structure using the URI associated with the data of the VCI, wherein the accessed data includes the first portion of data configured to be exposed to the protected entity data structure and does not include the second portion of data configured to be inaccessible to the protected entity data structure.

20. The one or more computer storage media of claim 15, wherein the computer-executable instructions, upon execution by the processor, further cause the processor to:
- access the combined data stream of the protected entity data structure of the VCI, wherein accessing the combined data stream of the protected entity data structure of the VCI includes causing an archive file of the combined data stream to be assembled, the archive file including the state document, the entity data stream, and at least one archive file associated with the identified at least one component of the VCI; and
- provide the assembled archive file in response to accessing the combined data stream of the protected entity data structure of the VCI.

* * * * *